United States Patent
Li et al.

(10) Patent No.: US 10,193,129 B2
(45) Date of Patent: Jan. 29, 2019

(54) PARALLEL BATTERY MODULE

(71) Applicant: NingDe Contemporary Amperex Technology Limited, NingDe, FuJian Province (CN)

(72) Inventors: Quankun Li, NingDe (CN); Pinghua Deng, NingDe (CN); Kai Wu, NingDe (CN); Xiaobo Chen, NingDe (CN); Peng Wang, NingDe (CN)

(73) Assignee: CONTEMPORARY AMPEREX TECHNOLOGY CO., LIMITED, Ningde, Fujian (CN)

( * ) Notice: Subject to any disclaimer, the term of this patent is extended or adjusted under 35 U.S.C. 154(b) by 199 days.

(21) Appl. No.: 15/195,972

(22) Filed: Jun. 28, 2016

(65) Prior Publication Data

US 2017/0077484 A1 Mar. 16, 2017

(30) Foreign Application Priority Data

Sep. 12, 2015 (CN) .......................... 2015 1 0578118

(51) Int. Cl.
*H01M 2/34* (2006.01)
*H01M 2/20* (2006.01)
*H01M 2/30* (2006.01)

(52) U.S. Cl.
CPC ........... *H01M 2/345* (2013.01); *H01M 2/204* (2013.01); *H01M 2/206* (2013.01); *H01M 2/30* (2013.01); *H01M 2/34* (2013.01); *H01M 2200/103* (2013.01); *H01M 2200/20* (2013.01)

(58) Field of Classification Search
CPC ...... H01M 2/345; H01M 2/204; H01M 2/206; H01M 2/30; H01M 2/34; H01M 2200/20; H01M 2200/103
USPC ...................................................... 429/7, 160
See application file for complete search history.

(56) References Cited

U.S. PATENT DOCUMENTS

| | | | |
|---|---|---|---|
| 8,777,668 B2 * | 7/2014 | Ikeda | H01M 2/206 439/627 |
| 8,932,739 B2 | 1/2015 | Hermann et al. | |
| 2015/0207131 A1 * | 7/2015 | Han | H01M 2/345 429/61 |
| 2015/0243957 A1 * | 8/2015 | Han | H01M 2/34 429/61 |

* cited by examiner

*Primary Examiner* — Gregg Cantelmo
(74) *Attorney, Agent, or Firm* — Arent Fox LLP (57) ABSTRACT

The present disclosure provides a parallel battery module comprising a plurality of battery cells, a first current collection connector, and a second current collection connector. The plurality of battery cells are in parallel connection. Each battery cell comprises a conducting top cover plate, a first terminal, a conducting connector, a second terminal, a bare cell, a fuse, and a conducting deformable piece. The first current collection connector and the second current collection connector are disposed on the top of the plurality of battery cells, and are electrically connected to the first terminal and the second terminal of the plurality of battery cells, respectively. When the conducting deformable piece of a battery cell deforms and becomes electrically connected to the conducting connector, the electrical connection between said battery cell and other battery cells is broken by blowing the first current collection connector and/or the second current collection connector.

11 Claims, 7 Drawing Sheets

PARALLEL BATTERY MODULE

CROSS-REFERENCE TO RELATED APPLICATION(S)

This application claims the benefit of Chinese Patent Application No. 201510578118.7, entitled "PARALLEL BATTERY MODULE" and filed on Sep. 12, 2015 in the State Intellectual Property Office of the People's Republic of China (PRC) (SIPO), the disclosure of which is expressly incorporated by reference herein in its entirety.

BACKGROUND

Field

The present disclosure relates generally to the field of energy storage devices, and more particularly, to a parallel battery module.

Background

Figure 1:
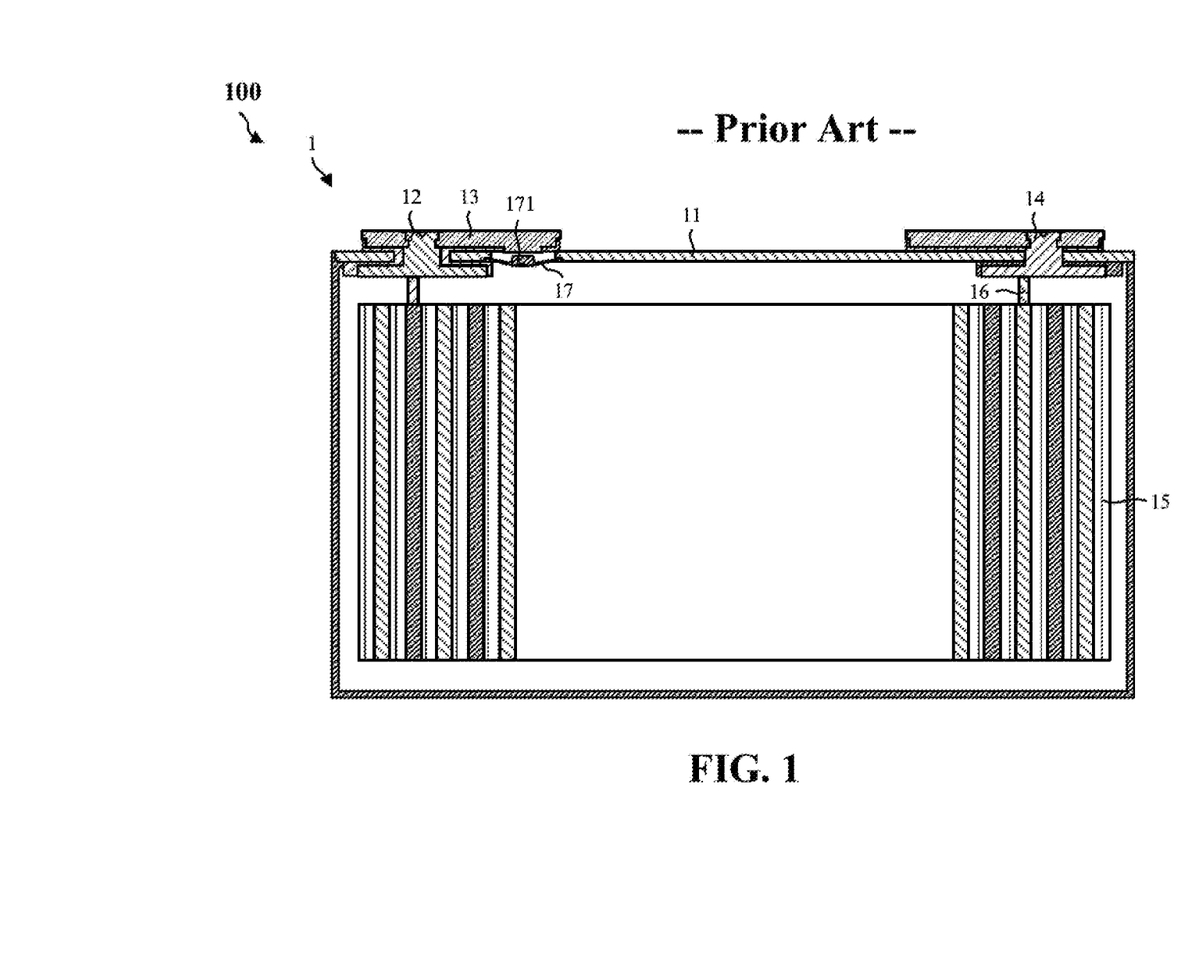
FIG. 1 is a diagram illustrating a main view of a battery cell of the parallel battery module according to the present disclosure.

When a battery is over-charged, the internal heat production and internal pressure of the battery are increased due to the decomposition of the battery electrolyte, which may lead to fire or explosion. As shown in FIG. 1, the structure commonly used by the industry right now to address overcharging is a combination of a conducting deformable piece 17 and a fuse 16. When the battery cell is over-charged and the internal gas pressure reaches a certain level, the conducting deformable piece 17 deforms such that a first terminal 12 is electrically connected to a conducting top cover plate 11 via a conducting connector 13. Because a second terminal 14 is electrically connected to the conducting top cover plate 11, an external short circuit can be formed between the first terminal 12 and the second terminal 14, thereby protecting the battery. When the current generated by the external short circuit is too high, it is likely to melt the conducting deformable piece 17. When the conducting deformable piece 17 is melted, the electrolyte inside the bare cell 15 will be ejected from the position of the conducting deformable piece 17 and in contact with the air. And at the same time, a high temperature is resulted due to the melting, which may cause a fire at the location of the conducting deformable piece 17, leading to a safety breach. To prevent the conducting deformable piece 17 from being melted, a fuse 16 is provided at the side of the second terminal 14 that is in connection with the bare cell 15. As a result, when the external short circuit is formed between the first terminal 12 and the second terminal 14 to consequently generate a high current, the fuse 16 is blown, which prevents the battery cell 1 from being continuously charged to cause a danger of fire or explosion, while ensuring that the conducting deformable piece 17 is not melted.

Figure 6:
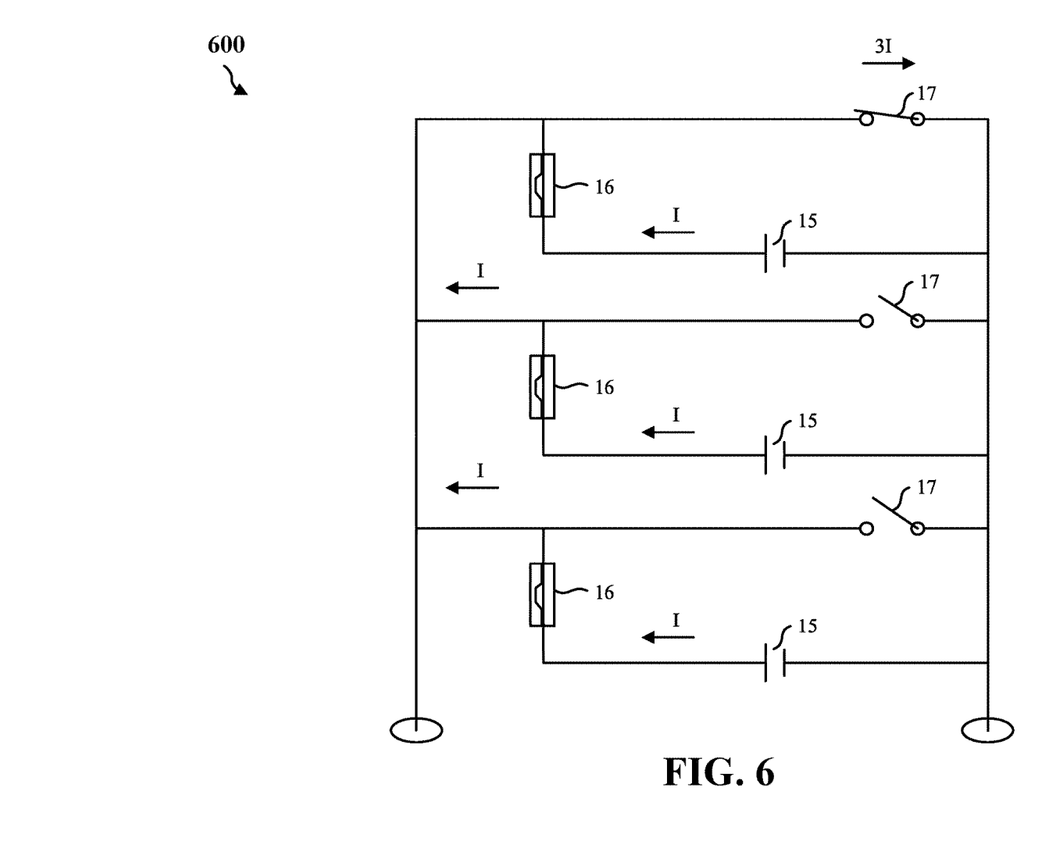
FIG. 6 is a schematic circuit diagram with the conducting deformable piece deformed in the parallel battery module according to traditional technologies.

Such a solution may solve the problem that a battery cell is over-charged or a battery module with multiple battery cells in series connection is over-charged. However, said solution cannot solve the problem that a battery module with multiple battery cells in parallel connection is over-charged. Referring to FIG. 1 and FIG. 6, when the battery cell 1 is over-charged and gas is produced, the conducting deformable piece 17 of a battery cell deforms. The first terminal 12 and the second terminal 14 of said battery cell 1 are connected and become equivalent to one single wire. This battery cell 1 forms an external short circuit on its own. Moreover, other battery cells in parallel will also form external short circuits through the conducting top cover plate 11 of this battery cell 1. As a result, the current flowing through the conducting top cover plate 11 and the conducting deformable piece 17 of this battery cell 1 is a sum of currents of all parallel battery cells, while the fuse 16 of each battery cell 1 only withstands its own current. Consequently, the conducting deformable piece 17 of said battery cell 1 may melt prior to the fuse 16. Thus, the connection of said battery cell 1 and the main charging circuit cannot be broken, leading to failure of the bare cell 15 of said battery cell 1 due to continuous charging.

In such a circumstance, the overcurrent cross sectional area of a single conducting deformable piece 17 may need to be greater than the overcurrent cross sectional area of the fuse 16. The overcurrent cross sectional area of the fuse 16 cannot be too small given the reliability requirement of the fuse 16 during a normal current and the strength requirement of the fuse 16 itself. The overcurrent cross sectional area of the fuse 16 of a battery cell used by the industry at present is typically 3 to 8 $mm^2$.

If the overcurrent cross sectional area of the fuse 16 is 4 $mm^2$, in an example of three battery cells in parallel connection, when a battery cell 1 is subject to external short circuit, the conducting deformable piece 17 of said battery cell 1 withstands the external short circuit current 3I applied by the three battery cells, while the fuse 16 only withstands the external short circuit current I of one single battery cell. As a result, the overcurrent cross sectional area of the conducting deformable piece 17 needs to be more than three times of that of the fuse 16, namely at least 12 $mm^2$. Due to the restriction by the battery size, however, the lengthwise and widthwise sizes of the conducting deformable piece 17 are restricted, and the overcurrent cross sectional area of the conducting deformable piece 17 cannot be infinitely enlarged.

Similarly, for a battery module with four or more battery cells in parallel connection, the overcurrent cross sectional area of the conducting deformable piece 17 may need to be greater than 16 $mm^2$, which may be difficult to accommodate due to the restriction by the battery size.

SUMMARY

In view of the problems described above, the objective of the present disclosure is to provide a parallel battery module that can lower the requirement regarding the overcurrent cross sectional area of the conducting deformable piece, ensure that the conducting deformable piece deforms normally when a battery cell is over-charged, and guarantee the over-charging safety of the parallel battery module.

To attain the above objective, the present disclosure provides a parallel battery module, comprising a plurality of battery cells, a first current collection connector, and a second current collection connector.

The plurality of battery cells are arranged in parallel. Each battery cell may include: a conducting top cover plate; a first terminal that is assembled to be insulated from the conducting top cover plate; a conducting connector that is electrically connected to the first terminal and insulated from the conducting top cover plate; a second terminal that has the opposite polarity to the first terminal and is assembled to be electrically connected to the conducting top cover plate; an bare cell that is electrically connected to the first terminal and the second terminal; a fuse that is connected between the first terminal and the bare cell or connected between the second terminal and the bare cell; and a conducting deformable piece that is electrically connected to the conducting top cover plate and is disposed below the conducting connector. When the internal gas pressure of a battery cell reaches a certain level, the conducting deformable piece deforms and becomes electrically connected to the conducting connector such that the first terminal and the second terminal are electrically connected to form an external short circuit.

The first current collection connector is disposed on the top of said plurality of battery cells and is electrically connected to the first terminals of said plurality of battery cells.

The second current collection connector is disposed on the top of said plurality of battery cells and is electrically connected to the second terminals of said plurality of battery cells.

Wherein, when the conducting deformable piece of a battery cell deforms and is electrically connected to the conducting connector, the electrical connection between said battery cell and other battery cells is broken by blowing the first current collection connector and/or the electrical connection between said battery cell and other battery cells is broken by blowing the second current collection connector.

The present disclosure has the following advantageous effects:

In the parallel battery module according to the present disclosure, when one battery cell is over-charged and when the conducting deformable piece deforms and is electrically connected to the conducting connector, the first terminal and the second terminal of said battery cell form an external short circuit via the conducting connector, the conducting deformable piece, and the conducting top cover plate. Other battery cells of the parallel battery module also form an external short circuit via the conducting connector, the conducting deformable piece, and the conducting top cover plate of said battery cell. The produced current first breaks the electrical connection between said battery cell and other battery cells by blowing the first current collection connector and/or breaks the electrical connection between said battery cell and other battery cells by blowing the second current collection connector, namely breaking external short circuits of other battery cells of the parallel battery module such that said over-charged battery cell is no longer charged, while other battery cells of the parallel battery module continue to be charged. The above sequence of events is repeated when a battery cell of the parallel battery module is subsequently over-charged. As a result, the requirement for the overcurrent cross sectional area of the conducting deformable piece of the parallel battery module is lowered, which ensures that the conducting deformable piece deforms normally without being melted when a battery cell is over-charged, and guarantees the over-charging safety of each battery cell of the parallel battery module.

BRIEF DESCRIPTION OF THE DRAWINGS

FIGS. 7A and 7B are schematic circuit diagrams with the conducting deformable piece deformed in the parallel battery module according to the present disclosure, wherein FIG. 7A shows three battery cells in parallel connection, and FIG. 7B shows two battery cells in parallel connection.

DETAILED DESCRIPTION

The present disclosure and the advantageous effects of certain configurations will be further described in detail below with reference to the accompanying drawings and specific embodiments.

The parallel battery module according to the present disclosure will be described in detail below with reference to the accompanying drawings.

Referring to FIG. 1 to FIG. 7, the parallel battery module according to the present disclosure comprises a plurality of battery cells 1, a first current collection connector 2, and a second current collection connector 3.

The plurality of battery cells 1 are arranged in parallel. Each battery cell 1 comprising: a conducting top cover plate 11; a first terminal 12 that is assembled to be insulated from the conducting top cover plate 11; a conducting connector 13 that is electrically connected to the first terminal 12 and insulated from the conducting top cover plate 11; a second terminal 14 that has the opposite polarity to the first terminal 12 and is assembled to be electrically connected to the conducting top cover plate 11; an bare cell 15 that is electrically connected to the first terminal 12 and the second terminal 14; a fuse 16 that is connected between the first terminal 12 and the bare cell 15 or connected between the second terminal 14 and the bare cell 15; and a conducting deformable piece 17 that is electrically connected to the conducting top cover plate 11 and is disposed below the conducting connector 13. When the internal gas pressure of a battery cell 1 reaches a certain level, the conducting deformable piece 17 deforms and becomes electrically connected to the conducting connector 13 such that the first terminal and the second terminal are electrically connected to form an external short circuit.

The first current collection connector 2 is disposed on the top of said plurality of battery cells 1 and is electrically connected to the first terminals 12 of said plurality of battery cells 1.

The second current collection connector 3 is disposed on the top of said plurality of battery cells 1 and is electrically connected to the second terminals 14 of said plurality of battery cells 1.

Wherein, when the conducting deformable piece 17 of a battery cell 1 deforms and becomes electrically connected to the conducting connector 13, the electrical connection between said battery cell 1 and other battery cells 1 is broken by blowing the first current collection connector 2 and/or the electrical connection between said battery cell 1 and other battery cells 1 is broken by blowing the second current collection connector 3.

In the parallel battery module according to the present disclosure, when one battery cell 1 is over-charged and when the conducting deformable piece 17 deforms and becomes electrically connected to the conducting connector 13, the first terminal 12 and the second terminal 14 of said battery cell 1 form an external short circuit via the conducting connector 13, the conducting deformable piece 17, and the conducting top cover plate 11. Each of the other battery cells 1 of the parallel battery module also forms an external short circuit via the conducting connector 13, the conducting deformable piece 17, and the conducting top cover plate 11 of said battery cell 1. The produced current first breaks the electrical connection between said battery cell 1 and other battery cells 1 by blowing the first current collection connector 2 and/or breaks the electrical connection between said battery cell 1 and other battery cells 1 by blowing the second current collection connector 3, namely breaking external short circuits of other battery cells of the parallel battery module such that said over-charged battery cell 1 is no longer charged, while other battery cells of the parallel battery module continue to be charged. The above sequence of events is repeated when a battery cell is subsequently over-charged. As a result, the requirement for the overcurrent cross sectional area of the conducting deformable piece 17 of the parallel battery module is lowered, which ensures that the conducting deformable piece 17 deforms normally without being melted when a battery cell 1 is over-charged, and guarantees the over-charging safety of each battery cell of a parallel battery module.

In the parallel battery module according to the present disclosure, the parallel battery module may be some battery cells in a big battery module that are in parallel connection, or may be all battery cells in a big battery module that are in parallel connection.

Figure 2:
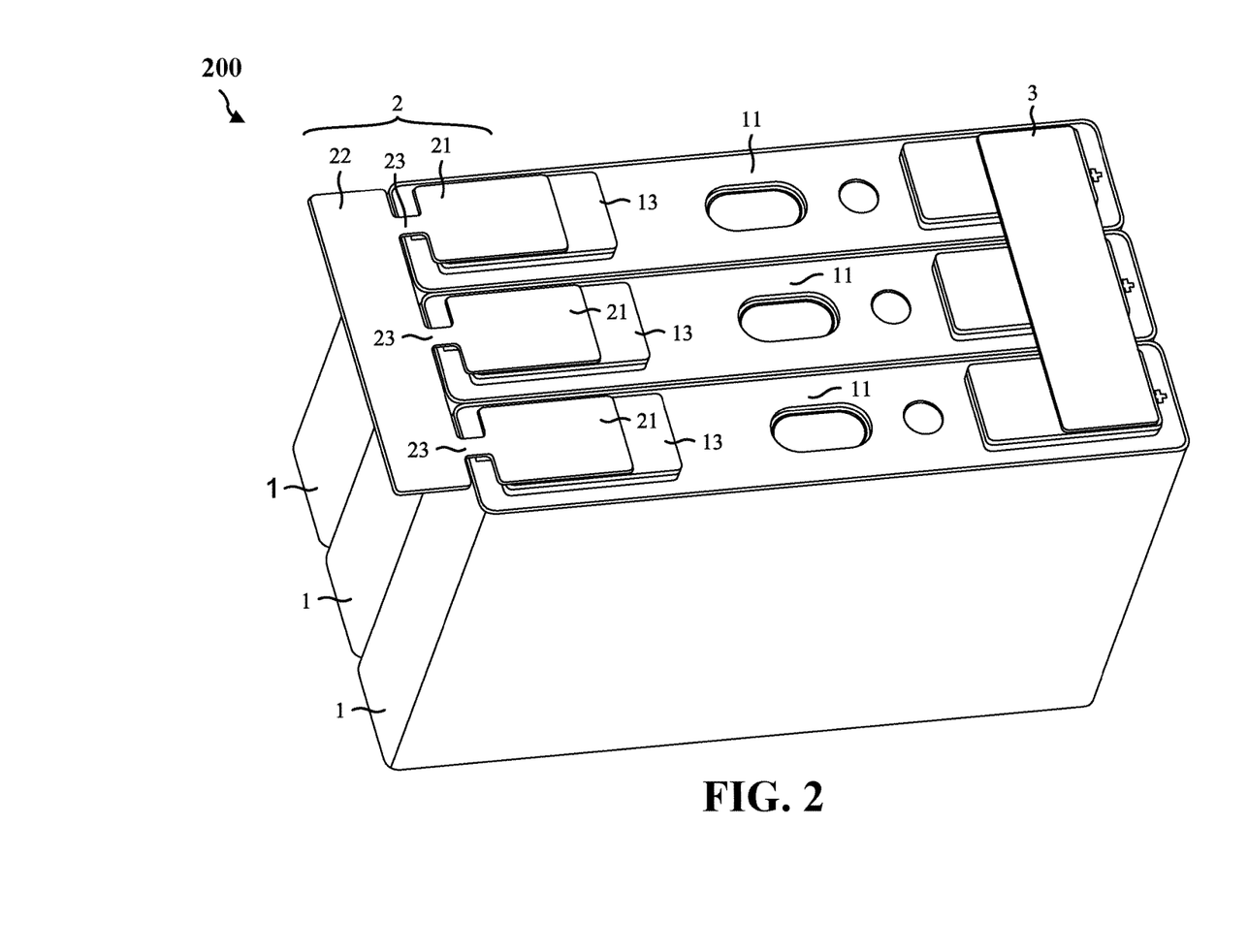
FIG. 2 is a diagram illustrating a 3-D view of a first embodiment of the parallel battery module according to the present disclosure.

In the parallel battery module according to the present disclosure, referring to FIG. 2, in the first embodiment, the first current collection connector 2 comprises: a plurality of first connection parts 21, the number of the first connection parts 21 being the same as the number of the battery cells 1 in the parallel battery module, each first connection part 21 being electrically connected to the first terminal 12 of a corresponding battery cell 1; a first current collection part 22; and a plurality of first fusing parts 23 connected between the first current collection part 22 and corresponding first connection parts 21.

When the conducting deformable piece 17 of a battery cell 1 deforms and becomes electrically connected to the conducting connector 13, the electrical connection between said battery cell 1 and other battery cells 1 is broken by blowing the first fusing part 23 of the first current collection connector 2 corresponding to said battery cell 1.

Figures 5A, 5B, 5C:
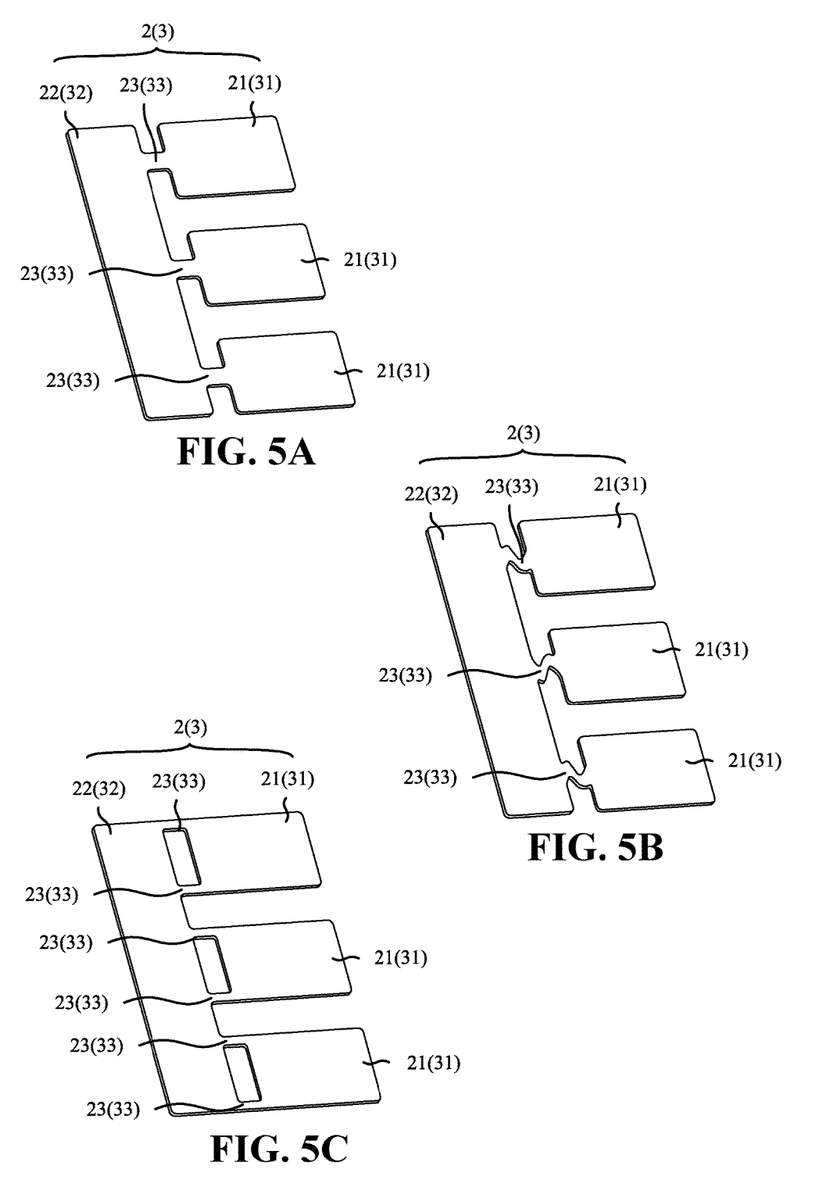
FIGS. 5A-5C are diagrams illustrating 3-D views of a first current collection connector (or a second current collection connector) of the parallel battery module according to the present disclosure, wherein the first fusing part (or the second fusing part) in FIG. 5A is rectangular, the first fusing part (or the second fusing part) in FIG. 5B is S-shaped, and there are two first fusing parts (or the second fusing parts) in FIG. 5C.

In the parallel battery module according to the present disclosure, referring to FIG. 5A and FIG. 5C, in the first embodiment, for one battery cell 1, the number of the first fusing part 23 connected between one first connection part 21 and the first current collection part 22 is at least one. A plurality of first fusing parts 23 for one first connection part 21 can improve the strength of connection between the first connection part 21 and the first current collection part 22.

Figure 7A:
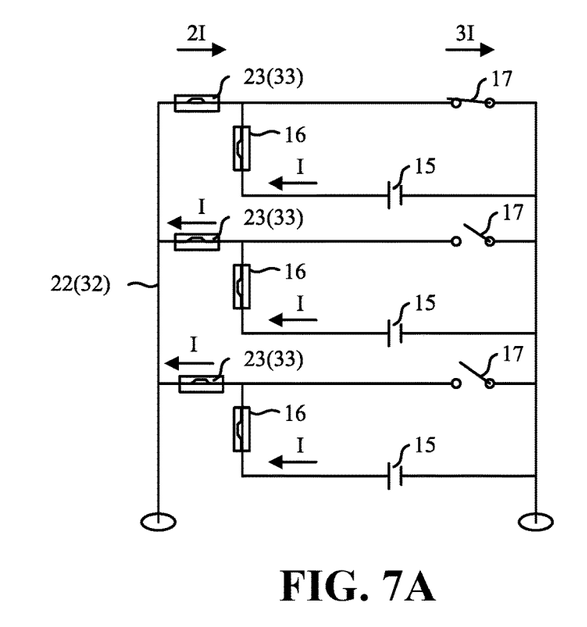
Figure 7B:
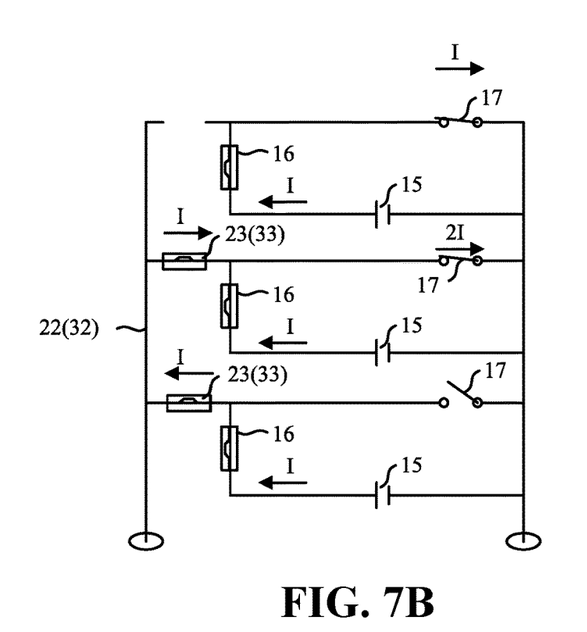

In the parallel battery module according to the present disclosure, referring to FIG. 7A and FIG. 7B, in the first embodiment, for one battery cell 1, the total overcurrent cross sectional area of all of the first fusing parts 23 connected between one first connection part 21 and the first current collection part 22 is smaller than one half of the contact area between the conducting deformable piece 17 and the conducting connector 13 of said battery cell 1 after the conducting deformable piece 17 deforms to be in contact with the conducting connector 13. Assuming that the number of battery cells 1 in the parallel battery module is n (n≥2), when one battery cell 1 is over-charged, the conducting deformable piece 17 of said battery cell 1 deforms and forms an external short circuit with the conducting connector 13. Each of the other battery cells that are not over-charged also forms an external short circuit via the conducting deformable piece 17 of said battery cell 1. The current produced by the external short circuit of each battery cell is I (one time the current). And at this moment, the current flowing through the conducting deformable piece 17 is nI (n times the current), while the current flowing through the first fusing part 23 connected to said battery cell 1 is (n−1)I. To ensure that said first fusing part 23 is blown prior to the conducting deformable piece 17 of said battery cell 1, the overcurrent cross sectional area of the first fusing part 23 is smaller than (n−1)/n of the overcurrent cross sectional area of the contact between the conducting deformable piece 17 and the conducting connector 13. In the present embodiment, the number of the battery cells 1 is 3 (n=3), then the current flowing through the conducting deformable piece 17 is 3I, the current flowing through the first fusing part 23 connected to said battery cell 1 is 2I. Therefore, the overcurrent cross sectional area of the first fusing part 23 is smaller than ⅔ of the overcurrent cross sectional area of the contact between the conducting deformable piece 17 and the conducting connector 13. Therefore, it can be seen that, when n=2, the required overcurrent cross sectional area of the contact between the conducting deformable piece 17 and the conducting connector 13 is the greatest, namely the total overcurrent cross sectional area of all of the first fusing parts 23 connected between one first connection part 21 and the first current collection part 22 is smaller than one half of the contact area between the conducting deformable piece 17 and the conducting connector 13 of said battery cell 1 after the conducting deformable piece 17 deforms to be in contact with the conducting connector 13.

In the parallel battery module according to the present disclosure, referring to FIG. 5A and FIG. 5B, in the first embodiment, each first fusing part 23 may be rectangular or S-shaped. In a practical use case of the parallel battery module, the parallel battery module may be subject to external vibration (e.g. shaking or falling). And battery cells 1 in the parallel battery module may consequently vibrate, which in turn produces a vibration force on the corresponding first current collection connector 2. At the same time, the bare cell 15 of the battery cell 1 also produce heat and expand, which produces an expansion force on the corresponding first current collection connector 2. Under said vibration force and expansion force, the first fusing part 23 of the first current collection connector 2 tends to be pulled apart due to the small overcurrent cross sectional area. An S-shaped first fusing part 23 may reduce the impact of said vibration force and expansion force to prevent the first fusing part 23 from being pulled apart.

Figure 3:
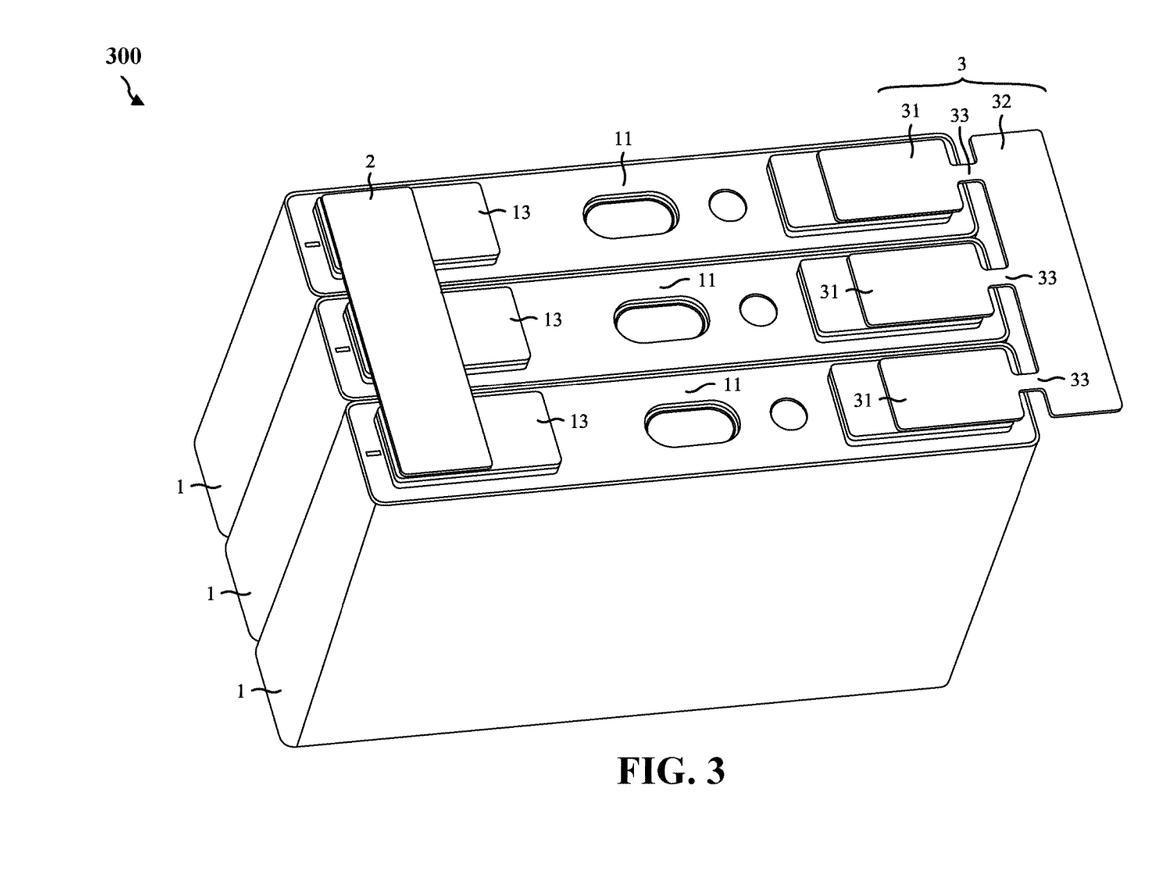
FIG. 3 is a diagram illustrating a 3-D view of a second embodiment of the parallel battery module according to the present disclosure.

In the parallel battery module according to the present disclosure, referring to FIG. 3, in one embodiment, the second current collection connector 3 comprises: a plurality of second connection parts 31, the number of the second connection parts being the same as the number of the battery cells 1 in the parallel battery module, each second connection part 31 being electrically connected to the second terminal 14 of a corresponding battery cell 1; a second current collection part 32; and a plurality of second fusing parts 33 connected between the second current collection part 32 and corresponding second connection parts 31. When the conducting deformable piece 17 of a battery cell 1 deforms and becomes electrically connected to the conducting connector 13, the electrical connection between said battery cell 1 and other battery cells 1 is broken by blowing the second fusing part 33 of the second current collection connector 3 corresponding to said battery cell 1.

In the parallel battery module according to the present disclosure, referring to FIG. 5A and FIG. 5C, in the second embodiment, for one battery cell 1, the number of the second fusing part 33 connected between one second connection part 31 and the second current collection part 32 is at least one. A plurality of first fusing part 33 for one second connection part 31 can improve the strength of connection between the second connection part 31 and the second current collection part 32.

In the parallel battery module according to the present disclosure, referring to FIG. 7A and FIG. B, in the second embodiment, for one battery cell 1, the total overcurrent cross sectional area of all of the second fusing parts 33 connected between one second connection part 31 and the second current collection part 32 is smaller than one half of the contact area between the conducting deformable piece 17 and the conducting connector 13 of said battery cell 1 after the conducting deformable piece 17 deforms to be in contact with the conducting connector 13.

In the parallel battery module according to the present disclosure, referring to FIG. 5A and FIG. 5B, in the second embodiment, each second fusing part 33 may be rectangular or S-shaped. In a practical use case of the parallel battery module, the parallel battery module may be subject to external vibration (e.g. shaking or falling), and battery cells 1 in the parallel battery module may consequently vibrate, which in turn produces a vibration force on the corresponding second current collection connector 3. At the same time, the bare cell 15 of the battery cell 1 will also produce heat and expand, which produces an expansion force on the corresponding second current collection connector 3. Under said vibration force and expansion force, the first fusing part 33 of the second current collection connector 3 tends to be pulled apart due to the small overcurrent cross sectional area. An S-shaped second fusing part 33 may reduce the impact of said vibration force and expansion force to prevent the second fusing part 33 from being pulled apart.

Figure 4:
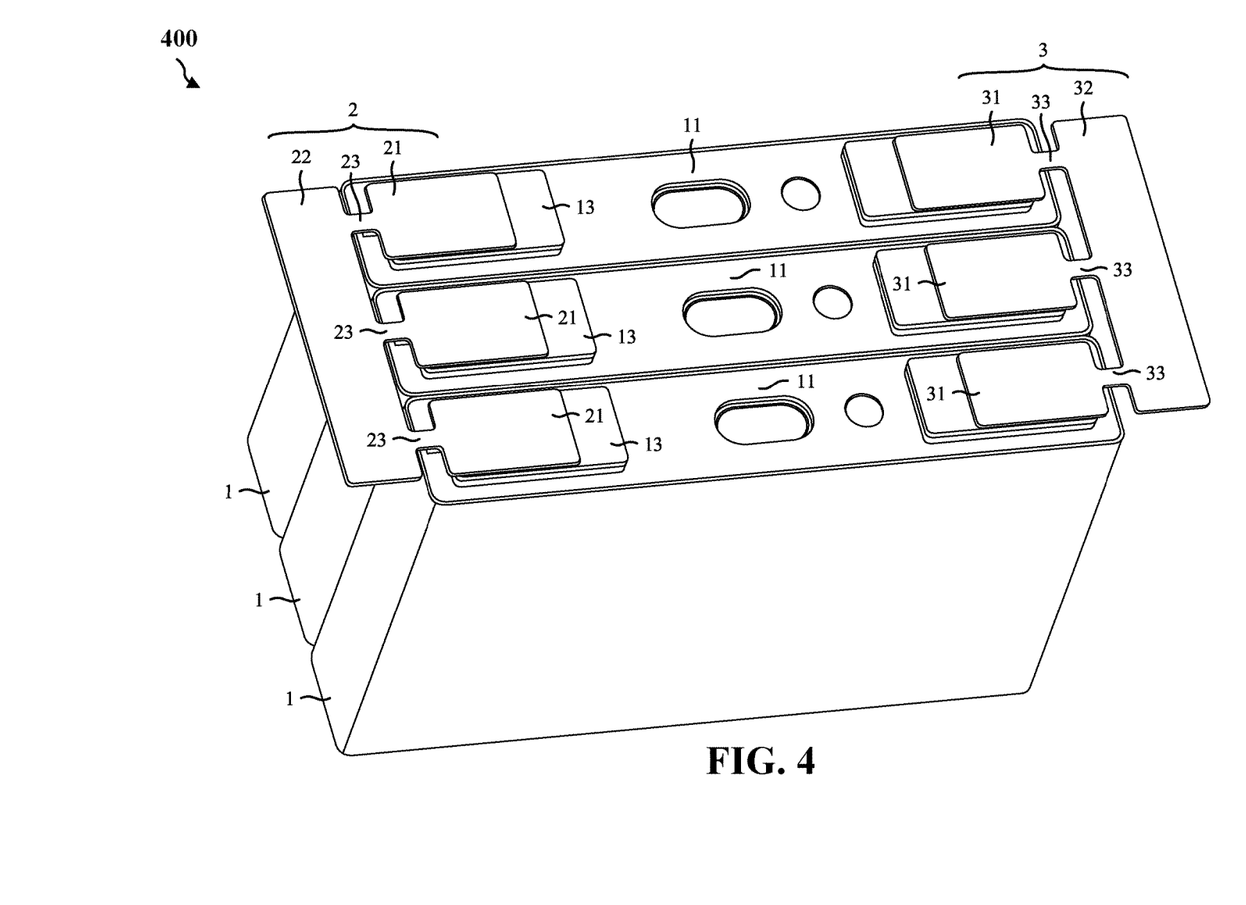
FIG. 4 is a diagram illustrating a 3-D view of a third embodiment of the parallel battery module according to the present disclosure.

In the parallel battery module according to the present disclosure, referring to FIG. 4, in the third embodiment, the first current collection connector 2 comprises: a plurality of first connection parts 21, the number of the first connection parts 21 being the same as the number of the battery cells 1 in the parallel battery module, each first connection part configured for electrical connection with the first terminal 12 of a corresponding battery cell 1; a first current collection part 22; and a plurality of first fusing parts 23 configured for connecting the first current collection part 22 and corresponding first connection parts 21.

The second current collection connector 3 comprises: a plurality of second connection parts 31, the number of the second connection parts 31 being the same as the number of the battery cells 1 in the parallel battery module, each second connection part 31 configured for electrical connection with the second terminals 14 of a corresponding battery cell 1; a second current collection part 32; and a plurality of second fusing parts 33 configured for connecting the second current collection part 32 and corresponding second connection parts 31.

When the conducting deformable piece 17 of a battery cell 1 deforms and becomes electrically connected to the conducting connector 13, the electrical connection between said battery cell 1 and other battery cells 1 is broken by blowing all of the first fusing parts 23 of the first current collection connector 2 and/or the second fusing parts 33 of the second current collection connector 3 corresponding to said battery cell 1.

In the parallel battery module according to the present disclosure, referring to FIG. 5A and FIG. 5C, in the third embodiment, for one battery cell 1, the number of the first fusing part 23 connected between one first connection part 21 and the first current collection part 22 is at least one, and the number of the second fusing part 33 connected between one second connection part 31 and the second current collection part 32 is at least one. A plurality of first fusing part 23 can improve the strength of connection between the first connection part 21 and the first current collection part 22, and a plurality of second fusing part 33 can improve the strength of connection between the second connection part 31 and the second current collection part 32.

In the parallel battery module according to the present disclosure, referring to FIG. 7A and FIG. 7B, in the third embodiment, for one battery cell 1, either the total overcurrent cross sectional area of all of the first fusing parts 23 connected between one first connection part 21 and the first current collection part 22 or the total overcurrent cross sectional area of all of the second fusing parts 33 connected between one second connection part 31 and the second current collection part 32 is smaller than one half of the contact area between the conducting deformable piece 17 and the conducting connector 13 of said battery cell 1 after the conducting deformable piece 17 deforms to be in contact with the conducting connector 13.

In the parallel battery module according to the present disclosure, referring to FIG. 5A and FIG. 5B, the first fusing part 23 may be rectangular or S-shaped, and the second fusing part 33 may be rectangular or S-shaped. In a practical use case of the parallel battery module, the parallel battery module may be subject to external vibration (e.g. shaking or falling). And battery cells 1 in the parallel battery module may consequently vibrate, which in turn produces a vibration force on the corresponding first current collection connector 2. At the same time, the bare cell 15 of the battery cell 1 also produce heat and expand, which produces an expansion force on the corresponding first current collection connector 2. Under said vibration force and expansion force, the first fusing part 23 of the first current collection connector 2 tends to be pulled apart due to the small overcurrent cross sectional area. An S-shaped first fusing part 23 may reduce the impact of said vibration force and expansion force to prevent the first fusing part 23 from being pulled apart. In addition, the battery cells 1 that produce vibration will similarly produce a vibration force on the corresponding second current collection connector 3. At the same time, the bare cell 15 of the battery cell 1 also produces heat and expand, which produces an expansion force on the corresponding second current collection connector 3. Under said vibration force and expansion force, the second fusing part 33 of the second current collection connector 3 tends to be pulled apart due to the small overcurrent cross sectional area. An S-shaped second fusing part 33 may reduce the impact of said vibration force and expansion force to prevent the second fusing part 33 from being pulled apart.

In the parallel battery module according to the present disclosure, referring to FIG. 1, in the above plurality of embodiments, the conducting deformable piece 17 comprises a protrusion 171 that is disposed in the middle of the conducting deformable piece 17 and protrudes in a direction toward the conducting connector 13 such that the protrusion 171 is electrically connected to the conducting connector 13 when the conducting deformable piece 17 deforms. The protrusion 171 can increase the contact area between the conducting deformable piece 17 and the conducting connector 13 after the conducting deformable piece 17 deforms to be in contact with the conducting connector 13, namely increase the overcurrent cross sectional area of the conducting deformable piece 17, improve the overcurrent prevention strength of the conducting deformable piece 17, and guarantee the over-charging safety of the parallel battery module.

According to the disclosure and description above, those skilled in the art may further make variations and modifications to the above embodiments. Therefore, the present disclosure is not limited by the specific embodiments disclosed and described above. Some equivalent variations and modifications to the present disclosure shall also be encompassed the claims of the present disclosure. Although the Description uses some specific terms, in addition, the terms are used only for the purpose of easy description, which do not constitute any limitation to the present disclosure.

What is claimed is:

1. A parallel battery module, comprising:
   a plurality of battery cells in parallel connection, each battery cell comprising:
     a conducting top cover plate;
     a first terminal that is assembled to be insulated from the conducting top cover plate;
     a conducting connector that is electrically connected to the first terminal and insulated from the conducting top cover plate;
     a second terminal that has an opposite polarity to the first terminal and is assembled to be electrically connected to the conducting top cover plate;
     a bare cell that is electrically connected to the first terminal and the second terminal;
     a fuse that is connected between the first terminal and the bare cell or connected between the second terminal and the bare cell; and
     a conducting deformable piece that is electrically connected to the conducting top cover plate and is disposed below the conducting connector, wherein the conducting deformable piece deforms and becomes electrically connected to the conducting connector such that the first terminal and the second terminal are electrically connected to form an external short circuit when an internal gas pressure of a battery cell reaches a certain level;
   a first current collection connector disposed on top of said plurality of battery cells and is electrically connected to the first terminals of said plurality of battery cells, wherein the first current collection connector comprises:
     a plurality of first connection parts, a total number of the plurality of first connection parts being the same as a total number of the plurality of battery cells, each first connection part being electrically connected to the first terminal of a corresponding battery cell;
     a first current collection part; and
     one or more first fusing parts connected between the first current collection part and a corresponding first connection part for each of the plurality of first connection parts; and
   a second current collection connector disposed on the top of said plurality of battery cells and is electrically connected to the second terminals of said plurality of battery cells,
   wherein, when the conducting deformable piece of the battery cell deforms and is electrically connected to the conducting connector, an electrical connection between said battery cell and other battery cells of the plurality of battery cells is broken by blowing the one or more first fusing parts corresponding to said battery cell of the first current collection connector to electrically isolate said battery cell from the other battery cells.

2. The parallel battery module of claim 1 wherein, for one battery cell, a total overcurrent cross sectional area of the one or more first fusing parts connected between one first connection part and the first current collection part is smaller than one half of a contact area between the conducting deformable piece and the conducting connector of said battery cell after the conducting deformable piece deforms to be in contact with the conducting connector.

3. The parallel battery module of claim 1, wherein each of the one or more first fusing parts is rectangular or S-shaped.

4. A parallel battery module, comprising:
   a plurality of battery cells in parallel connection, each battery cell comprising:
     a conducting top cover plate;
     a first terminal that is assembled to be insulated from the conducting top cover plate;
     a conducting connector that is electrically connected to the first terminal and insulated from the conducting top cover plate;
     a second terminal that has an opposite polarity to the first terminal and is assembled to be electrically connected to the conducting top cover plate;
     a bare cell that is electrically connected to the first terminal and the second terminal;
     a fuse that is connected between the first terminal and the bare cell or connected between the second terminal and the bare cell; and
     a conducting deformable piece that is electrically connected to the conducting top cover plate and is disposed below the conducting connector, wherein the conducting deformable piece deforms and becomes electrically connected to the conducting connector such that the first terminal and the second terminal are electrically connected to form an external short circuit when an internal gas pressure of a battery cell reaches a certain level;
   a first current collection connector disposed on top of said plurality of battery cells and is electrically connected to the first terminals of said plurality of battery cells; and
   a second current collection connector disposed on the top of said plurality of battery cells and is electrically connected to the second terminals of said plurality of battery cells,
   wherein the second current collection connector comprises:
     a plurality of second connection parts, a total number of the plurality of second connection parts being the same as a total number of the plurality of battery cells, each second connection part being electrically connected to the second terminal of a corresponding battery cell;
     a second current collection part; and
     one or more second fusing parts connected between the second current collection part and a corresponding second connection part for each of the plurality of second connection parts,
   wherein, when the conducting deformable piece of the battery cell deforms and becomes electrically connected to the conducting connector, the electrical connection between said battery cell and the other battery cells is broken by blowing the one or more second fusing parts of the second current collection connector corresponding to said battery cell.

5. The parallel battery module of claim 4, wherein, for one battery cell, a total overcurrent cross sectional area of the one or more second fusing parts connected between one second connection part and the second current collection part is smaller than one half of a contact area between the conducting deformable piece and the conducting connector of said battery cell after the conducting deformable piece deforms to be in contact with the conducting connector.

6. The parallel battery module of claim 4, wherein each of the one or more second fusing parts is rectangular or S-shaped.

7. A parallel battery module, comprising:
a plurality of battery cells in parallel connection, each battery cell comprising:
   a conducting top cover plate;
   a first terminal that is assembled to be insulated from the conducting top cover plate;
   a conducting connector that is electrically connected to the first terminal and insulated from the conducting top cover plate;
   a second terminal that has an opposite polarity to the first terminal and is assembled to be electrically connected to the conducting top cover plate;
   a bare cell that is electrically connected to the first terminal and the second terminal;
   a fuse that is connected between the first terminal and the bare cell or connected between the second terminal and the bare cell; and
   a conducting deformable piece that is electrically connected to the conducting top cover plate and is disposed below the conducting connector, wherein the conducting deformable piece deforms and becomes electrically connected to the conducting connector such that the first terminal and the second terminal are electrically connected to form an external short circuit when an internal gas pressure of a battery cell reaches a certain level;
a first current collection connector disposed on top of said plurality of battery cells and is electrically connected to the first terminals of said plurality of battery cells; and
a second current collection connector disposed on the top of said plurality of battery cells and is electrically connected to the second terminals of said plurality of battery cells,
wherein:
the first current collection connector comprises:
   a plurality of first connection parts, a total number of the plurality of first connection parts being the same as a total number of the plurality of battery cells, each first connection part configured for electrical connection with the first terminal of a corresponding battery cell;
   a first current collection part; and
   one or more first fusing parts configured for connecting the first current collection part and a corresponding first connection part for each of the plurality of first connection parts;
the second current collection connector comprises:
   a plurality of second connection parts, a total number of the plurality of second connection parts being the same as a total number of the plurality of battery cells, each second connection part configured for electrical connection with the second terminals of a corresponding battery cell;
   a second current collection part; and
   one or more second fusing parts configured for connecting the second current collection part and a corresponding second connection part for each of the plurality of second connection parts; and
when the conducting deformable piece of the battery cell deforms and becomes electrically connected to the conducting connector, the electrical connection between said battery cell and the other battery cells is broken by blowing at least one of the one or more first fusing parts of the first current collection connector corresponding to said battery cell or the one or more second fusing parts of the second current collection connector corresponding to said battery cell.

8. The parallel battery module of claim 7, wherein, for one battery cell, a total overcurrent cross sectional area of the one or more first fusing parts connected between one first connection part and the first current collection part is smaller than one half of a contact area between the conducting deformable piece and the conducting connector of said battery cell after the conducting deformable piece deforms to be in contact with the conducting connector.

9. The parallel battery module of claim 7, wherein each of the one or more first fusing parts is rectangular or S-shaped.

10. The parallel battery module of claim 7, wherein, for one battery cell, a total overcurrent cross sectional area of the one or more second fusing parts connected between one second connection part and the second current collection part is smaller than one half of a contact area between the conducting deformable piece and the conducting connector of said battery cell after the conducting deformable piece deforms to be in contact with the conducting connector.

11. The parallel battery module of claim 7, wherein each of the one or more second fusing parts is rectangular or S-shaped.

* * * * *